United States Patent
Shichino

(10) Patent No.: US 10,498,179 B2
(45) Date of Patent: Dec. 3, 2019

(54) POWER TRANSMISSION APPARATUS, POWER RECEPTION APPARATUS, METHODS OF CONTROLLING THESE, AND NON-TRANSITORY COMPUTER-READABLE STORAGE MEDIUM

(71) Applicant: CANON KABUSHIKI KAISHA, Tokyo (JP)

(72) Inventor: Takahiro Shichino, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 173 days.

(21) Appl. No.: 15/670,164

(22) Filed: Aug. 7, 2017

(65) Prior Publication Data

US 2018/0076672 A1  Mar. 15, 2018

(30) Foreign Application Priority Data

Sep. 13, 2016  (JP) ................... 2016-179024

(51) Int. Cl.
*H02J 50/80* (2016.01)
*H04B 5/00* (2006.01)
*H02J 7/00* (2006.01)
*H02J 7/04* (2006.01)
*H02J 50/12* (2016.01)
*H02J 7/02* (2016.01)

(52) U.S. Cl.
CPC ............ *H02J 50/80* (2016.02); *H02J 7/0091* (2013.01); *H02J 7/047* (2013.01); *H02J 50/12* (2016.02); *H04B 5/0037* (2013.01); *H02J 7/025* (2013.01)

(58) Field of Classification Search
CPC .. H02J 50/10; H02J 50/12; H02J 50/80; H02J 7/0091; H02J 7/047; H02J 7/025; H04B 5/0037
USPC .......................................................... 307/104
See application file for complete search history.

(56) References Cited

U.S. PATENT DOCUMENTS

2014/0159654 A1*  6/2014  Lee ................... H02J 7/025
                                                          320/108

FOREIGN PATENT DOCUMENTS

| JP | 2001258182 A | 9/2001 |
| JP | 2003153457 A | 5/2003 |
| JP | 2013192281 A | 9/2013 |
| JP | 5768464 B2 | 8/2015 |

* cited by examiner

*Primary Examiner* — Hal Kaplan
(74) *Attorney, Agent, or Firm* — Rossi, Kimms & McDowell LLP

(57) ABSTRACT

A power transmission apparatus that performs power transmission wirelessly to a power reception apparatus, performs power transmission wirelessly, detects a temperature inside or in a periphery of the power transmission apparatus, sets a value for power that can be transmitted to the power reception apparatus under a condition where the detected temperature does not exceed a predetermined temperature when power transmission to the power reception apparatus is performed, and performs power transmission to the power reception apparatus based on the set value for power.

20 Claims, 7 Drawing Sheets

FIG. 3A
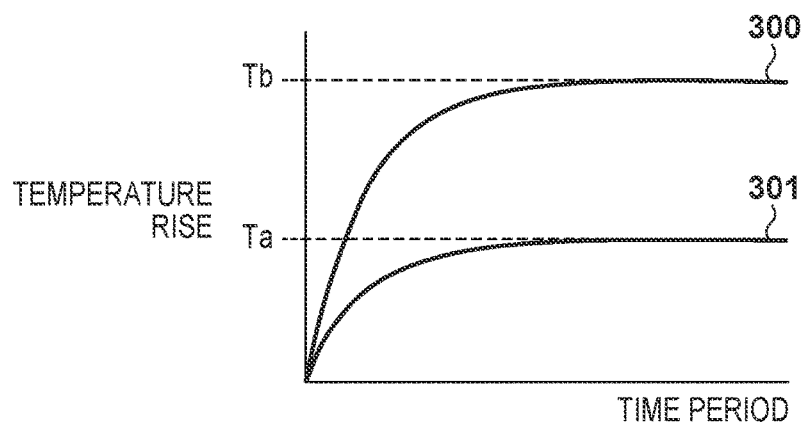
FIG. 3B
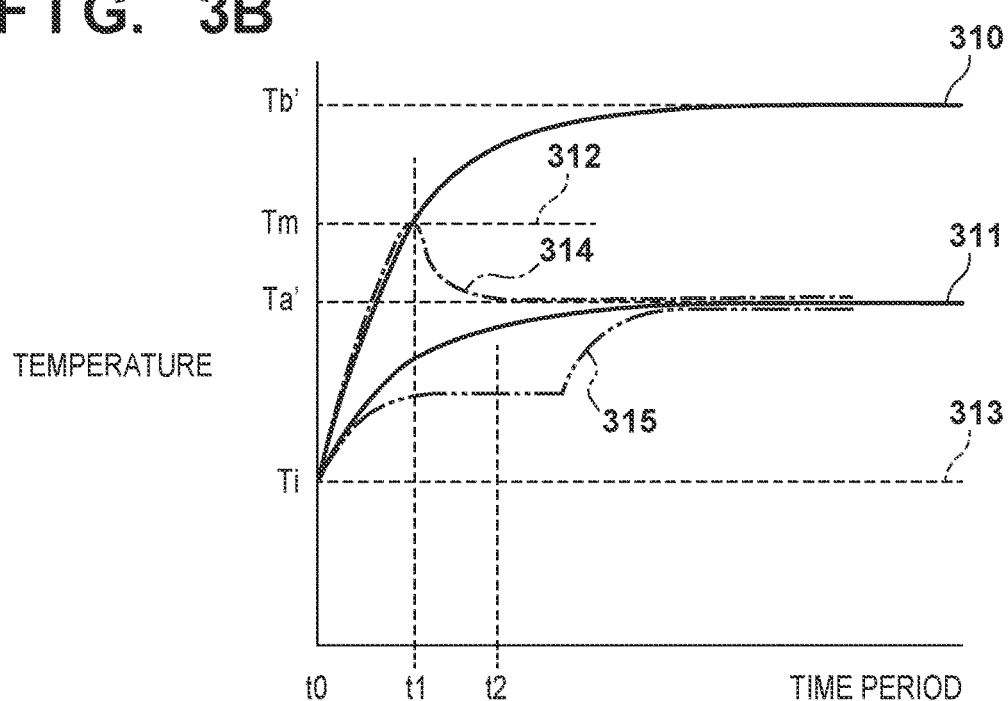
FIG. 4
| OUTPUT POWER (WATT) | TEMPERATURE RISE (°C) | |
|---|---|---|
| 15 | 30 | ~400 |
| 10 | 20 | ~401 |
| 5 | 10 | ~402 |
| 3 | 5 | ~403 |

POWER TRANSMISSION APPARATUS, POWER RECEPTION APPARATUS, METHODS OF CONTROLLING THESE, AND NON-TRANSITORY COMPUTER-READABLE STORAGE MEDIUM

BACKGROUND OF THE INVENTION

Field of the Invention

The present invention relates to a technique for wireless power transmission.

Description of the Related Art

In recent years, development of techniques for a wireless power transmission system has been widespread. Japanese Patent Laid-Open No. 2001-258182 proposes a power transmission apparatus that stops power transmission if a temperature greater than or equal to a predetermined value is detected in a wireless power transmission system.

When a temperature that is greater than or equal to the predetermined value is detected and power transmission is stopped, there are cases where because power is not supplied to the power reception apparatus in the meantime, an inconvenience occurs on the power reception apparatus side. Accordingly, a technique for setting such that the predetermined temperature is not exceeded even if power transmission is performed is desired.

SUMMARY OF THE INVENTION

According to one aspect of the present invention, there is provided a power transmission apparatus that performs power transmission wirelessly to a power reception apparatus, the power transmission apparatus comprising: a power transmitting unit configured to perform power transmission wirelessly; a detection unit configured to detect a temperature inside or in a periphery of the power transmission apparatus; and a setting unit configured to set a value for power that can be transmitted to the power reception apparatus under a condition where the temperature detected by the detection unit does not exceed a predetermined temperature when the power transmitting unit performs power transmission to the power reception apparatus, wherein the power transmitting unit performs power transmission to the power reception apparatus based on the value for power set by the setting unit.

Further features of the present invention will become apparent from the following description of exemplary embodiments (with reference to the attached drawings).

BRIEF DESCRIPTION OF THE DRAWINGS

FIGS. 3A through 3B represent a relation between a temperature detected by the power transmission apparatus, and a temperature at which operation is guaranteed.

FIG. 4 represents a relation between output power of the power reception apparatus and a temperature rise of a power transmitting unit.

DESCRIPTION OF THE EMBODIMENTS

Below, with reference to the attached drawings, a detailed explanation is given for the present invention based on embodiments. Note that configurations illustrated in the following embodiments are merely examples, and the present invention is not limited to the illustrated configurations.

First Embodiment

Figure 1:
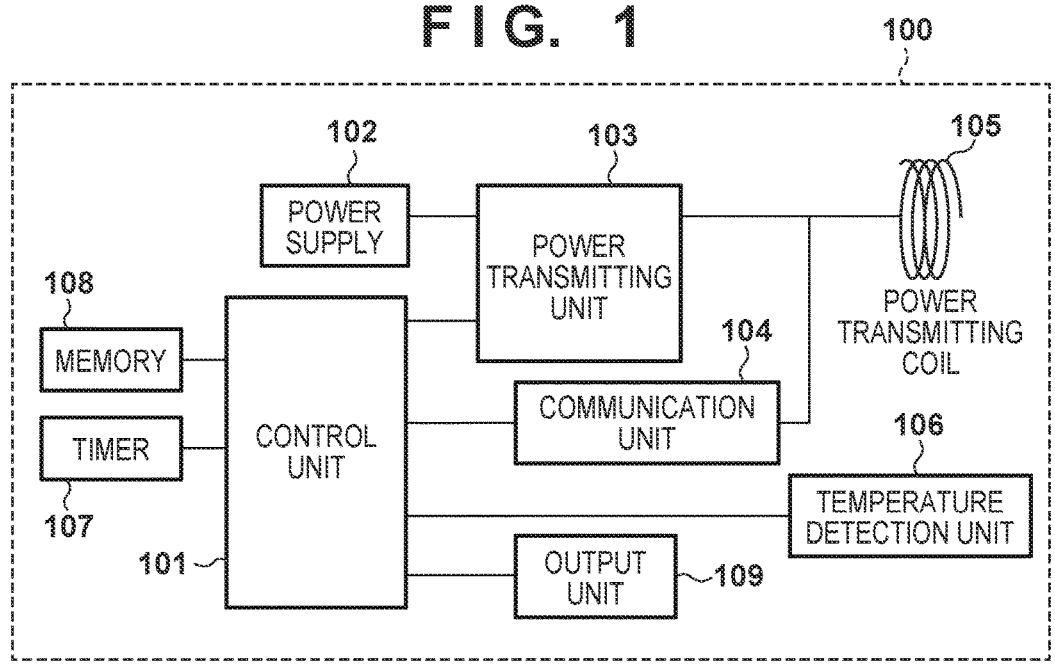
FIG. 1 illustrates a configuration of a power transmission apparatus in an embodiment.
Figure 2:
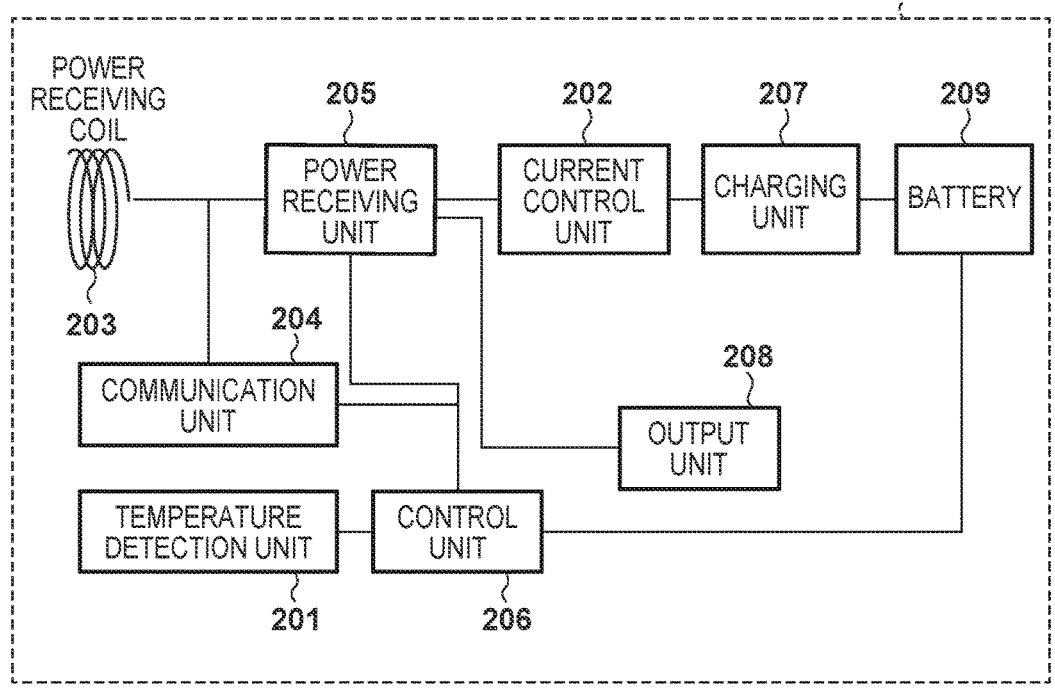
FIG. 2 illustrates a configuration of a power reception apparatus in an embodiment.

FIG. 1 illustrates a configuration of a power transmission apparatus 100 in a first embodiment. The power transmission apparatus 100 has a control unit 101, a power supply 102, a power transmitting unit 103, a communication unit 104, a power transmitting coil 105, a temperature detection unit 106, a timer 107, a memory 108, and an output unit 109. The power transmission apparatus 100 wirelessly transmits power to a power reception apparatus 200 (FIG. 2).

The control unit 101 controls the apparatus overall by executing a control program stored in the memory 108. An example of the control unit 101 is a CPU (Central Processing Unit). The control unit 101, for example, uses the memory 108 when storing a value of a variable while executing the control program. The control unit 101 uses the timer 107 when measuring a time period.

The power supply 102 supplies power to the power transmitting unit 103 when a wireless power transmission from the power transmission apparatus 100 is performed. The power supply 102 is a commercial power supply or a battery. The power transmitting unit 103 converts direct current power or alternating current power inputted from the power supply 102 into power of an alternating current frequency in a frequency band used in wireless power transmission, and causes the power transmitting coil 105 to generate an electromagnetic wave for causing the power reception apparatus 200 to receive power. In addition, the power transmitting unit 103, based on an instruction from the control unit 101, outputs from the power transmitting coil 105 electromagnetic waves for transmitting power to the power reception apparatus 200. In addition, by adjusting a voltage (a power transmission voltage) or a current (a power transmission current) that are inputted to the power transmitting coil 105, the power transmitting unit 103 controls the intensity of electromagnetic waves that are caused to be outputted. When the power transmission voltage or the power transmission current is increased, the intensity of the electromagnetic waves becomes higher. In addition, the power transmitting unit 103 performs control to stop power transmission from the power transmitting coil 105, based on an instruction by the control unit 101.

The communication unit 104 performs control communication relating to wireless power transmission between the power reception apparatus 200 and a communication unit 204. In the present embodiment, control communication is performed by modulating power transmitted from the power transmitting coil 105.

The temperature detection unit 106 has a function of detecting a temperature, and is realized by a thermometer or a thermocouple. The temperature detection unit 106 detects temperatures inside the power transmission apparatus 100 and at a peripheral location. The temperature detection unit 106 is inside the power transmission apparatus 100, and detects the temperature of one or more of the power transmitting coil 105, the communication unit 104, and the casing of the power transmission apparatus 100. Each electronic component that configures the power transmitting unit 103, the power transmitting coil 105, or the communication unit 104 has an upper limit for temperatures at which operation is guaranteed, and operation is not guaranteed if the temperature has exceeded the respective upper limit. Accordingly, from the viewpoint of safety, if the temperature of the power transmitting unit 103, the power transmitting coil 105, or the communication unit 104 has exceeded a respective upper limit, it is necessary to restrict power transmission by the power transmitting unit 103. In addition, because a user may touch the casing of the power transmission apparatus 100, it is similarly necessary to restrict power transmission if the temperature of the casing exceeds a predetermined temperature. In addition, for the periphery of the power transmission apparatus 100, the temperature detection unit 106 detects a temperature of air surrounding the outside of the casing of the power transmission apparatus 100 (hereinafter referred to as an environmental temperature). Because the environmental temperature also has an upper limit for temperatures at which operation is guaranteed for the power transmission apparatus 100 to operate normally, it is necessary to restrict power transmission by the power transmission apparatus 100 if the environmental temperature exceeds the upper limit.

The output unit 109 performs various outputs to a user. Here output by the output unit 109 includes at least one of a color change, blinking, or lighting of an LED (Light Emission Diode); displaying on a screen; audio output by a speaker; a vibration output; or the like.

Note that the power transmission apparatus 100 is not just an apparatus dedicated to power transmission, but may be an apparatus having functionality other than power transmission, such as a printer or a PC (Personal Computer), for example.

FIG. 2 illustrates a configuration of the power reception apparatus 200 in the present embodiment. The power reception apparatus 200 has a temperature detection unit 201, a current restriction unit 202, a power receiving coil 203, the communication unit 204, a power receiving unit 205, a control unit 206, a charging unit 207, an output unit 208, and a battery 209. The temperature detection unit 201 has similar function to that of the temperature detection unit 106 of the power transmission apparatus 100, and explanation thereof is omitted.

The current restriction unit 202 has a function for restricting a charging current when the charging unit 207 charges the battery 209. By a function of the current restriction unit 202, output power from the power receiving unit 205 (power outputted to the charging unit 207 by the power receiving unit 205) is increased or decreased. Below, unless there is a specific designation, output power from the power receiving unit 205 is simply represented as the "output power".

The power receiving coil 203 receives an electromagnetic wave that is for transmitting power that is wirelessly supplied from the power transmission apparatus 100. The power receiving unit 205 generates power from the electromagnetic wave received by the power receiving coil 203. Specifically, the power receiving unit 205 resonates in accordance with the electromagnetic waves received by the power receiving coil 203, and alternating current power is obtained in accordance with the resonance. The power receiving unit 205 converts the alternating current power into direct current power or alternating current power of a desired frequency, and outputs the power to the battery 209 and the charging unit 207 which charges the battery 209.

The communication unit 204 performs control communication for the wireless power transmission performed via the power transmitting coil 105 of the power transmission apparatus 100 and the power receiving coil 203 of the power reception apparatus 200. In the present embodiment, control communication is performed via the power receiving coil 203. The communication unit 204 operates by receiving a power supply from the power receiving unit 205. The battery 209 stores power received by the power receiving unit 205, and supplies power to at least the control unit 206. The control unit 206 controls the apparatus overall by executing a control program stored in a memory (not shown). An example of the control unit 206 is a CPU.

The power receiving unit 205, upon receiving power sufficient for a detection circuit (not shown) for detecting output power from the power receiving unit 205 and the communication unit 204 to activate, supplies the communication unit 204 with power for control communication. Such a case is, for example, when an alternating-current voltage from the power receiving coil 203 exceeds a fixed value, or when a voltage resulting from converting the alternating-current voltage to a direct current exceeds a fixed value. The communication unit 204 receives the power supply and performs control communication.

The output unit 208 performs various outputs to a user. Here output by the output unit 208 includes at least one of a color change, blinking, or lighting of an LED; displaying on a screen; audio output by a speaker; a vibration output; or the like.

Next, with reference to FIGS. 3A through 3B, explanation is given regarding a relation between a temperature detected by the power transmission apparatus 100, and temperatures at which operation is guaranteed. Note that, in the present embodiment it is assumed that the temperature of the power transmitting unit 103 of the power transmission apparatus 100 is detected.

FIG. 3A illustrates a relation between a time period (abscissa) from when the power transmission apparatus 100 starts transmitting power and a temperature rise (ordinate) detected by the temperature detection unit 106 of the power transmission apparatus 100, with output power of the power reception apparatus 200 as a parameter. The rises in temperature of FIG. 3A represent temperature rises with reference to the environmental temperature (the temperature of air outside of the casing of the power transmission apparatus 100). A curved line 300 is a temperature rise characteristic when the output power is 15 watts, and a curved line 301 is a temperature rise characteristic when the output power is 5 watts. According to the curved line 300, when the output power is 15 watts, the power transmitting unit 103 rises by Tb ° C. with respect to the environmental temperature. Similarly, according to the curved line 301, when the output power is 5 watts, the power transmitting unit 103 rises by Ta ° C. with respect to the environmental temperature. In the present embodiment, it is assumed that Tb=30° C. and Ta=10° C.

FIG. 3B illustrates a relation between a time period (abscissa) from when the power transmission apparatus 100 starts transmitting power and a temperature (ordinate) detected by the temperature detection unit 106 of the power transmission apparatus 100, with output power of the power reception apparatus 200 as a parameter. A temperature 312 represents an upper-limit value (a maximum temperature) for temperature of the power transmitting unit 103, and is represented as Tm. The control unit 101 of the power transmission apparatus 100 causes power transmission by the power transmitting unit 103 to stop when the temperature of the power transmitting unit 103 reaches the maximum temperature Tm. In the present embodiment, it is assumed that Tm=60° C.

A temperature 313 illustrates an environmental temperature or a temperature of the power transmitting unit 103 at the start of power transmission, and is represented as Ti. At the start of power transmission, the power transmitting unit 103 is not operating, and thus power supplied from the power supply 102 is not consumed. Accordingly, it may be considered that the temperature of the power transmitting unit 103 at the start of power transmission to be substantially equal to the environmental temperature. In the present embodiment, it is assumed that Ti=45° C.

A temperature Ta' illustrates a maximum value for the temperature of the power transmitting unit 103 when the output power is 5 watts. In other words, the temperature Ta' is a value resulting from adding the temperature Ti of the power transmitting unit 103 and the temperature rise Ta when the output power is 5 watts. In other words, when the temperature Ti is 45° C. and the output power is 5 watts, the temperature Ta' is 55° C. which is a value resulting from adding 10° C. (Ta) to 45° C. (Ti). Similarly, a temperature Tb' illustrates a maximum value for the temperature of the power transmitting unit 103 when the output power is 15 watts. In other words, when the temperature Ti is 45° C. and the output power is 15 watts, the temperature Tb' is 75° C., a value resulting from adding 30° C. (Tb) to 45° C. (Ti). In other words, when the power transmission apparatus 100 is transmitting power so that the output power is 15 watts, because the temperature of the power transmitting unit 103 reaches the maximum temperature Tm (60° C.) at the time t1, it is necessary for the power transmission apparatus 100 to stop power transmission. As a result, the power receiving unit 205 of the power reception apparatus 200 cannot continuously charge the battery.

FIG. 4 represents a relation between output power from the power reception apparatus 200 (unit: watts) and a temperature rise of the power transmitting unit 103 (unit: ° C.). By a row 400, when the output power is 15 watts the temperature rise of the power transmitting unit 103 is 30° C., and this temperature rise corresponds to the temperature Tb of FIG. 3A. By a row 401, when the output power is 10 watts the temperature rise of the power transmitting unit 103 is 20° C. By a row 402, when the output power is 5 watts the temperature rise of the power transmitting unit 103 is 10° C., and this temperature rise corresponds to the temperature Ta of FIG. 3A. By a row 403, when the output power is 3 watts the temperature rise of the power transmitting unit 103 is 5° C.

Figure 5:
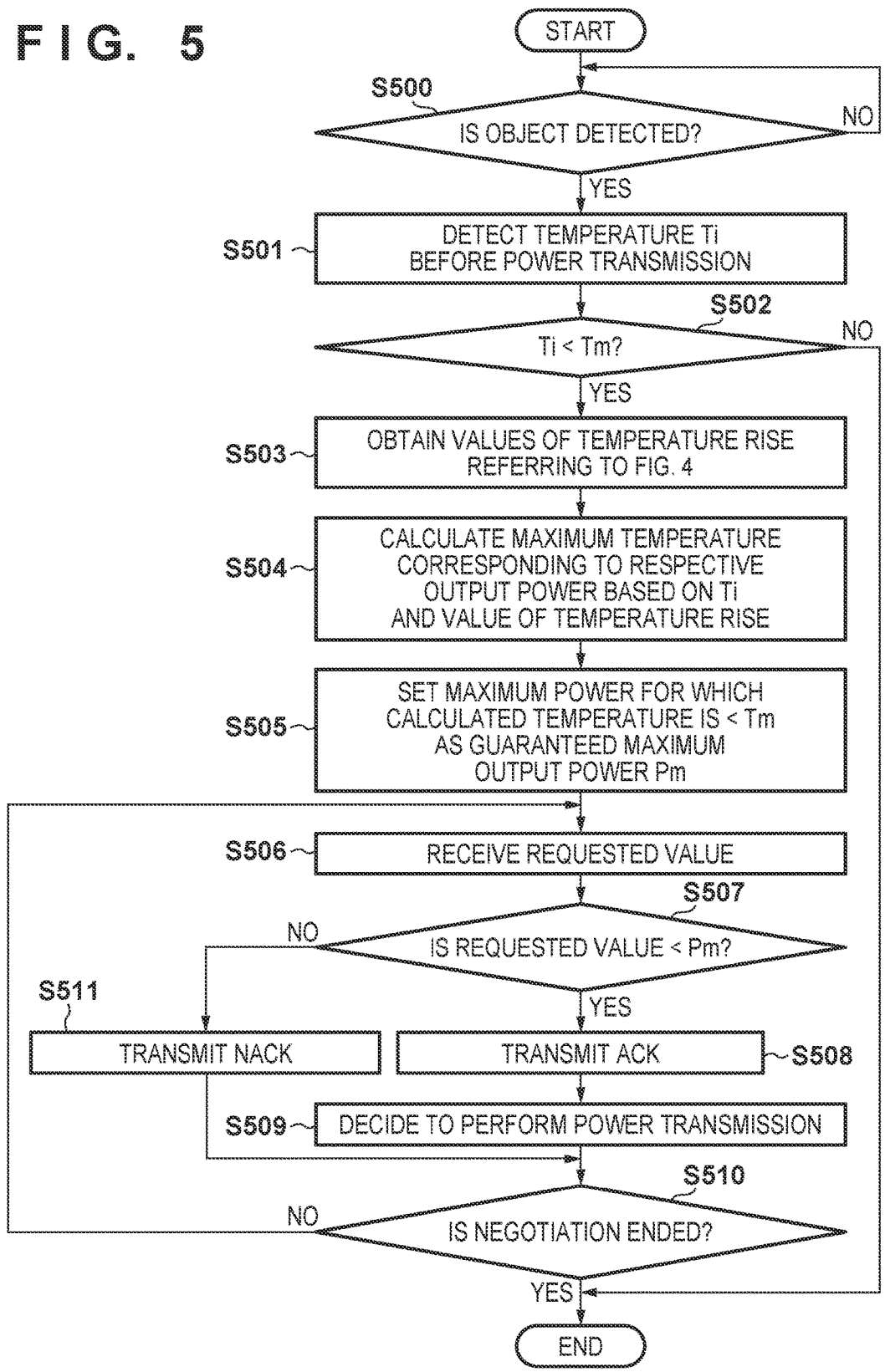
FIG. 5 illustrates a processing flow of the power transmission apparatus in the first embodiment.

Next, with reference to FIG. 3A through FIG. 5, explanation is given regarding operation of the power transmission apparatus 100 in the present embodiment. From processing flows of the power transmission apparatus 100 in the present embodiment, FIG. 5 is a processing flow for until power transmission to the power reception apparatus 200 starts. As mentioned previously, in FIG. 3A, the temperature Ta is 10° C. and the temperature Tb is 30° C. In addition, in FIG. 3B the maximum temperature Tm is 60° C., the temperature Ti is 45° C., the temperature Ta' is 55° C., and the temperature Tb' is 75° C. Note that, in the present embodiment, a detection result by the temperature detection unit 106 is the curved line 311 of FIG. 3B.

Firstly, the power transmission apparatus 100 performs object detection in step S500. At the time of the object detection, the power transmitting unit 103 periodically applies a small amount of power to the power transmitting coil. The control unit 101 then detects, in accordance with change of an applied voltage or current, that an object (the power reception apparatus 200 or another object) is present in a space where power transmission by the power transmission apparatus 100 is possible.

When the control unit 101 detects an object (YES in step S500), authentication is performed between the power transmission apparatus 100 and the power reception apparatus 200. After authentication succeeds, the control unit 101 obtains, via the temperature detection unit 106, a temperature Ti of the power transmitting unit 103 before power transmission (step 501). Note that the authentication between the power transmission apparatus 100 and the power reception apparatus 200 indicates, for example, exchange between both apparatuses of identification information, corresponding power transmission standard names, and power transmission/power reception capabilities. Because the temperature Ti (45° C.) of the power transmitting unit 103 is smaller than the maximum temperature Tm (60° C.) (YES in step S502), the control unit 101 decides to perform power transmission.

In step S503, the control unit 101 obtains a value of a temperature rise with respect to the output power, referring to FIG. 4. Next, in step S504, the control unit 101 calculates a maximum value for temperature of the power transmitting unit 103 with respect to each value of output power, based on the temperature Ti (45° C.) of the power transmitting unit 103 before power transmission and the values of the temperature rise that were obtained in step S503. Specifically, when the output power is 15 watts, the control unit 101 adds 30° C. to the temperature Ti (45° C.) to thereby calculate 75° C. In addition, when the output power is 10 watts, the control unit 101 adds 20° C. to the temperature Ti (45° C.) to thereby calculate 65° C. In addition, when the output power is 5 watts, the control unit 101 adds 10° C. to the temperature Ti (45° C.) to thereby calculate 55° C. In addition, when the output power is 3 watts, 5° C. is added to the temperature Ti (45° C.) to thereby calculate 50° C.

In step S505, the control unit 101 obtains the maximum output power (power than can be output) with a condition that the temperature calculated in step S504 does not exceed the maximum temperature Tm (60° C.). In other words, the control unit 101 obtains the maximum output power from the output power values for which the temperature calculated in step S504 is smaller than the maximum temperature Tm (60° C.). Specifically, because output power values for which the temperature calculated in step S504 is smaller than the maximum temperature Tm (60° C.) are 5 watts and 3 watts, the control unit 101 obtains 5 watts as the maximum output power. The control unit 101 sets the obtained "5 watts" as maximum power (guaranteed maximum output power) Pm in a negotiation for "guaranteed output power" that is described later. In other words, the power transmission apparatus 100 recognizes that power transmission is possible such that the power reception apparatus 200 can output power less than or equal to the maximum output power, which is 5 watts.

Next, the control unit 101 uses the communication unit 104 to perform a negotiation regarding guaranteed output power at the power reception apparatus 200 (step S506 through step S510). Note that there are cases in which, during transmission of power from the power transmission apparatus 100 to the power reception apparatus 200, power transfer efficiency between the power transmission apparatus 100 and the power reception apparatus 200 decreases due to a change of a positional relationship between the power transmitting coil 105 and the power receiving coil 203. In such a case, the power transmission apparatus 100 increases the transmitted power to compensate for the decrease of output power from the power reception apparatus 200 caused by the decrease in efficiency. In other words, the power reception apparatus can continue to supply a load (a battery or a battery charging circuit) with at least the guaranteed power independent of the positional relationship between the power transmitting coil and the power receiving coil. In addition, the power receiving unit 205, in a case of trying to output power greater than the guaranteed output power that was decided by the negotiation, needs to negotiate with the power transmission apparatus 100 again. In the present embodiment, a negotiation regarding the guaranteed output power at the power reception apparatus 200 is assumed to be performed in accordance with whether the power transmission apparatus 100 accepts a request received from the power reception apparatus 200 that includes a value for requested maximum output power.

In addition, the power decided by the negotiation may be maximum power, and may be both of the guaranteed power and the maximum power. The maximum power indicates the maximum value of power that the power reception apparatus outputs to a load. In the following explanation, in order to simplify the explanation, mention is only given for guaranteed power below, but the guaranteed power may be replaced by maximum power, and both the guaranteed power and maximum power may be included.

In step S506, it is assumed that the control unit 101 of the power transmission apparatus 100 receives a request that includes a requested value (15 watts) for maximum output power via the communication unit 104. Because the requested value (15 watts) is not less than or equal to the guaranteed maximum output power Pm (5 watts) (NO in step S507), the control unit 101 transmits, via the communication unit 104, a NACK (a notification indicating that power transmission will not be performed) that indicates to the power reception apparatus 200 that the request is not acknowledged (step S511). It is assumed that the control unit 101 does not receive a message from the power reception apparatus 200 indicating to the effect that the negotiation has ended (NO in step S510), but newly receives a request that includes a requested value for maximum output power (5 watts). The requested value (5 watts) is less than or equal to the guaranteed maximum output power Pm (5 watts) (YES in step S507). When 5 watts is guaranteed as the output power of the power reception apparatus 200, the temperature of the power transmitting unit 103 can be estimated to be 55° C. as described above, which does not exceed the maximum temperature Tm (60° C.). Accordingly, the power reception apparatus 200 can continue to output 5 watts. The control unit 101 transmits to the power reception apparatus 200 an ACK (a notification indicating that power transmission will be performed) indicating that the request is permitted (step S508), notifying the power reception apparatus 200 that 5 watts of output power is guaranteed. In addition, the control unit 101 decides to perform power transmission with power necessary for the power receiving unit 205 to output at 5 watts (step S509). By receiving the ACK, the power reception apparatus 200 confirms that the request passed, and transmits to the power transmission apparatus 100 a message indicating the end of the negotiation.

Upon receiving the message indicating the end of the negotiation (YES in step S510), the control unit 101 ends the processing, and starts transmission of power to the power reception apparatus 200 at the time t0 of FIG. 3B. In other words, the power transmitting unit 103 performs power transmission with power necessary for the power receiving unit 205 of the power reception apparatus 200 to output 5 watts of power.

Note that, when the temperature Ti of the power transmitting unit 103 before power transmission exceeds the maximum temperature Tm, the control unit 101 determines not to transmit power, and ends the processing. In addition, from FIG. 4 and the processing of step S503, the control unit 101 sets the guaranteed maximum output power Pm to be smaller the larger the temperature Ti of the power transmitting unit 103 before power transmission is. For example, if the environmental temperature is 50° C. and the guaranteed maximum output power Pm is set to 5 watts, the maximum value of the temperature of the power transmitting unit 103 with respect to the output power is 60° C. that results from adding 10° C. to the temperature Ti (50° C.), which exceeds the maximum temperature Tm (60° C.). When the environmental temperature is 50° C., the guaranteed maximum output power Pm is set to 3 watts (smaller than 5 watts). By this, the maximum value of the temperature of the power transmitting unit 103 with respect to the output power becomes 55° C. resulting from adding 5° C. to the temperature Ti (50° C.), and so it is possible to set power such that the maximum temperature Tm is not exceeded.

In this way, configuration is such that the power transmission apparatus 100 in the present embodiment obtains an environmental temperature (or the temperature of the power transmitting unit 103 before power transmission), and changes the guaranteed maximum output power Pm based on the obtained temperature. Accordingly, while the power transmission apparatus 100 performs control such that the upper limit of the temperature of the power transmitting unit 103 is not exceeded, the power reception apparatus 200 can continue to supply power to a load (battery) continuously. In addition, before the time t0 when power is transmitted, the control unit 101 confirms that the guaranteed maximum output power Pm is such that the maximum temperature Tm is not exceeded. By this, because power transmission does not stop due to the temperature rise, it is possible to prevent the occurrence of a phenomenon in which charging is not possible even though the power reception apparatus 200 has been placed on a charging stand by a user of the power reception apparatus 200.

(First Variation)

Figure 6A:
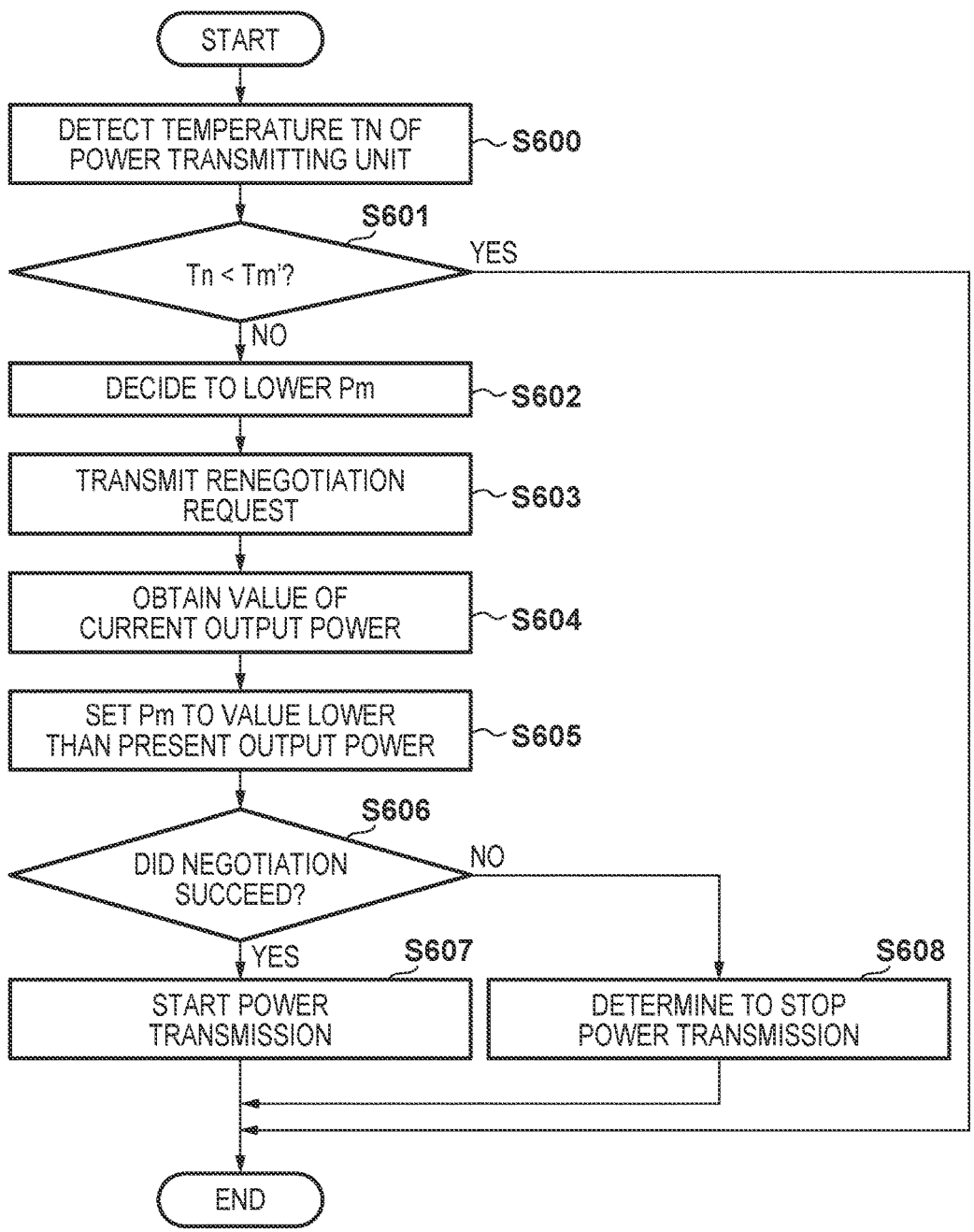
FIGS. 6A through 6B illustrate processing flows of the power transmission apparatus in a first variation.
Figure 6B:
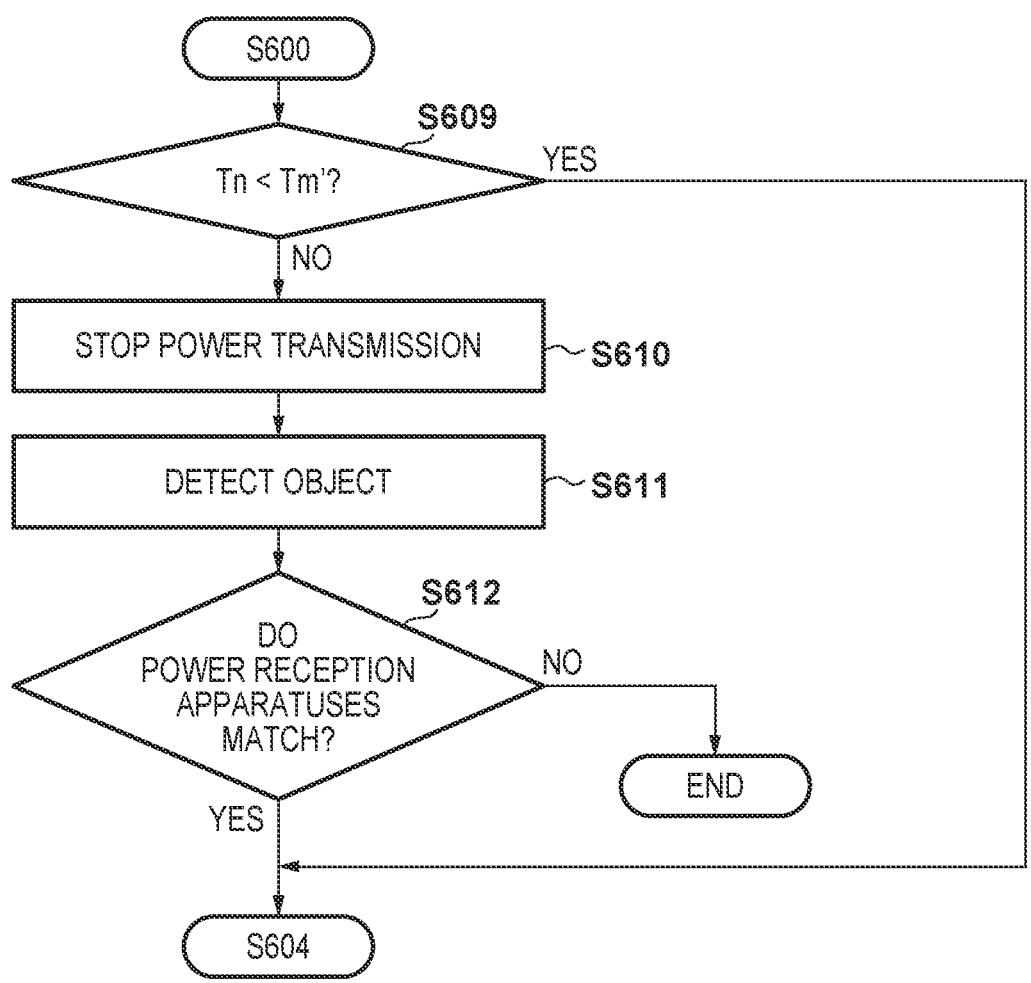

In the first embodiment, explanation was given regarding an example in which the power transmission apparatus 100, before starting power transmission at the time t0, decides the guaranteed maximum output power Pm based on the temperature Ti of the power transmitting unit 103. In the first variation, explanation is given with reference to FIGS. 6A through 6B of an example in which the guaranteed maximum output power Pm is decided (changed) after starting power transmission. FIGS. 6A through 6B are processing flows of the power transmission apparatus 100 in the present variation. Note that, in the first variation, a detection result by a temperature detection unit is a curved line 314 illustrated by a dashed-dotted line in FIG. 3B.

At the time t0, the control unit 101 starts power transmission based on the guaranteed maximum output power Pm decided based on factors other than temperature. For example, it is assumed that the power transmission apparatus 100 receives from the power reception apparatus 200 a request that includes a requested value (15 watts) for maximum output power, and as a result of a negotiation, starts power transmission with the guaranteed maximum output power Pm as 15 watts. At this point, a detection result by the temperature detection unit 106 follows a curved line 310 of FIG. 3B for a time after the start of power transmission.

In step S600, the control unit 101 periodically detects the temperature Tn of the power transmitting unit 103 via the temperature detection unit 106. The control unit 101 changes the guaranteed maximum output power Pm based on the temperature Tn of the power transmitting unit 103 and a temperature Tm' that is lower than the maximum temperature Tm. Here the temperature Tm' is set to a temperature that is a few ° C. lower than the maximum temperature Tm. In addition, in the explanation of the first variation, explanation is given reading the time t1 of FIG. 3B as a time t1' earlier than the time t1, and the maximum temperature Tm as the temperature Tm'.

Because the temperature Tn does not exceed the temperature Tm' during the time t0 to the time t1 (YES in step S601), the control unit 101 ends processing and performs the processing of step S600 again. When the temperature Tn exceeds the temperature Tm' at the time t1' (NO in step S601), the control unit 101 decides to lower the guaranteed maximum output power Pm (step S602). This is because, when the power transmission apparatus 100 transmits the guaranteed output power at 15 watts unchanged, the temperature Tm will be exceeded at the time t1, and the power transmission must stop.

Accordingly, the control unit 101, in step S603, transmits, via the communication unit 104, a renegotiation request that is a message requesting negotiation regarding the guaranteed output power (step S603). The control unit 101 then obtains the current output power of the power receiving unit 205 that is notified from the power reception apparatus 200 via the communication unit 104 (step S604). The control unit 101 sets the guaranteed maximum output power Pm based on the current output power of the power receiving unit 205 obtained in step S604 (step S605). For example, if the current output power is 13 watts and the guaranteed maximum output power Pm is 15 watts, the control unit 101 sets the guaranteed maximum output power Pm to be smaller than 13 watts. This is because there is a possibility that the output power will vary between 13 watts and 15 watts, as the guaranteed maximum output power Pm is 15 watts at the current time. In addition, because the temperature Tn of the power transmitting unit 103 is exceeding the temperature Tm' at the time t1', the temperature Tm will be exceeded if the output power is not made to be smaller than 13 watts.

Firstly, the control unit 101 performs a negotiation with the power reception apparatus 200, setting the guaranteed maximum output power Pm as 12 watts. Specifically, the control unit 101 receives from the power reception apparatus 200 a request that includes a requested value for guaranteed maximum output power. Here, the requested value is 15 watts. Because this is larger than 13 watts which is the guaranteed maximum output power Pm, the power transmission apparatus 100 transmits a NACK. The power reception apparatus 200, because it received the NACK, performs negotiation by lowering the requested value, and as a result receives an ACK when it makes a request that sets 12 watts as the requested value, and the negotiation succeeds (YES in step S606). When negotiation succeeds, the control unit 101 starts power transmission that sets the guaranteed maximum output power Pm as 12 watts (step S607), and returns to the processing of step S600. At this point, the output power of the power receiving unit 205 is at most 12 watts (smaller than 13 watts). When negotiation fails (NO in step S606), a determination is made to stop power transmission (step S608).

The control unit 101 repeats the processing of step S600 to step S607, and determines whether the temperature Tn of the power transmitting unit 103 has decreased below the temperature Tm', while lowering the guaranteed maximum output power Pm. Here, it is assumed that, when the control unit 101 has set the guaranteed maximum output power Pm to 5 watts, the temperature Tn of the power transmitting unit 103 has become lower than the temperature Tm' (YES in step S601). In that case, the control unit 101 ends the processing and returns the processing to step S600 again.

In this way, by processing that changes the guaranteed maximum output power Pm when the temperature Tn of the power transmitting unit 103 has exceeded the temperature Tm' which is close to the maximum temperature Tm, it is possible to obtain a similar effect to that of the first embodiment. Similarly to in the first embodiment, as the environmental temperature (the temperature of the power transmitting unit when power transmission starts) increases, the guaranteed maximum output power Pm decreases. The maximum temperature Tm is uniquely decided in accordance with, for example, parts that configure the power transmitting unit 103, but the temperature Ta' and the temperature Tb' in FIG. 3A can vary in accordance with the environmental temperature. Accordingly, as the environmental temperature increases, the guaranteed output power should decrease.

Furthermore, the first variation is useful in an environment when change of the environmental temperature is sharp. This is because the control unit 101 decides the guaranteed maximum output power Pm based on the current temperature Tn of the power transmitting unit 103, and there is no consideration for the environmental temperature.

Note that, in the explanation above, the power transmission apparatus 100 received a notification of the current output power of the power receiving unit 205 from the power reception apparatus 200. In substitution for this, the power transmission apparatus 100 may calculate (estimate) the current output power of the power receiving unit 205 from power received by the power receiving unit 205 (power inputted to the power receiving unit 205) and the efficiency of the power receiving unit 205. For example, configuration may be taken such that the power reception apparatus 200 notifies the power transmission apparatus 100 of the power received by the power receiving unit 205 and the efficiency of the power receiving unit 205, and the power transmission apparatus 100 multiplies the received power and the efficiency to calculate the output power.

In addition, in the first variation, in step S603 the power transmission apparatus 100 transmitted a renegotiation request to the power reception apparatus 200, but in substitution for this a processing flow illustrated in FIG. 6B may be followed. In step S600, upon obtaining the temperature Tn of the power transmitting unit 103 via the temperature detection unit 106, the control unit 101, in step S609, stops power transmission if the temperature Tn is not smaller than the maximum temperature Tm (step S610). Next, the control unit 101 performs the object detection and authentication explained in step S500 of FIG. 5 (step S611). If the control unit 101 detects a power reception apparatus as an object, based on identification information of the power reception apparatus that is received at the time of the authentication, it is determined whether there is a match between the detected power reception apparatus and the power reception apparatus when the power transmission stopped in step S610 (step S612). If the power reception apparatuses match (step S612), the control unit 101 advances the processing to step S604, and negotiates with the power reception apparatus 200 regarding the guaranteed maximum output power Pm. If the power reception apparatuses do not match (NO in step S612), the control unit 101 ends the processing. By determining whether the power reception apparatuses match in step S612, it is possible to omit processing for before the time t0 (processing to decide the maximum value Pm of the guaranteed maximum output power based on factors other than temperature) of the explanation for the first variation.

By virtue of the processing flow of FIG. 6B, there is the effect that processing becomes simplified because the power transmission apparatus 100 does not transmit a renegotiation request. Furthermore, there is the effect that a charging time period for a battery shortens because, until the temperature Tn of the power transmitting unit 103 reaches the temperature Tm', the power receiving unit 205 can output power without being restricted by the temperature Tn. In addition, it is clear that there is a similar effect even if the control unit 101 operates based on the processing flow of FIG. 6A during power transmission after deciding the guaranteed maximum output power Pm before the time t0 based on the processing flow of FIG. 5.

(Second Variation)

In the second variation, explanation is given regarding a different method for deciding the guaranteed maximum output power Pm. Note that, in the first variation, a detection result by the temperature detection unit 106 is a curved line 315 illustrated by a dashed-two dotted line in FIG. 3B. In the second variation, if the temperature of the power transmitting unit 103 reaches a steady state at a temperature lower than the maximum temperature Tm, the control unit 101 of the power transmission apparatus 100 adjusts the guaranteed maximum output power Pm through a negotiation with the power reception apparatus 200. For example, assume that the power transmission apparatus 100 initially starts power transmission at the time t0 with the guaranteed maximum output power Pm as 3 watts, and the temperature of the power transmitting unit 103 enters a steady state at the time t2. At this point, if the temperature Tn of the power transmitting unit 103 is less than the maximum temperature Tm, the control unit 101 may raise the guaranteed maximum output power Pm to 5 watts. Even with such a method, a similar effect to that of the first embodiment and the first variation is obtained.

In addition, by a method that combines the first variation and the second variation, appropriate control is possible even in an environment where variation of the environmental temperature is sharp. For an environment where variation of the environmental temperature is sharp, a case where air conditioning is turned on inside a vehicle with fully closed windows may be considered. Initially, in a high temperature environment inside the vehicle, a negotiation to lower the guaranteed maximum output power Pm is performed between the power transmission apparatus 100 and the power reception apparatus 200 in accordance with the processing flow of the first variation (FIG. 6A) or the processing flow of the first embodiment (FIG. 5), and then the power transmission apparatus 100 starts power transmission. Next, the temperature inside the vehicle decreases due to the effect of the air conditioning and the control unit 101, in response to it being detected that the temperature Tn of the power transmitting unit 103 has entered a steady state or decreased due to the effect of the air conditioning, compares the temperature Tn of the power transmitting unit 103 with the maximum temperature Tm. For example, if the maximum temperature Tm is greater than the temperature Tn of the power transmitting unit 103 by 10° C. or more, the control unit 101 may perform processing to gradually raise the guaranteed maximum output power Pm in accordance with the second variation (similar processing to the processing at the time t2).

In addition, the power reception apparatus receives a renegotiation request that is transmitted by the power transmission apparatus in step S603. At the time of the renegotiation, the power reception apparatus needs to decide a value for guaranteed power to transmit to the power transmission apparatus, but as a consequence it is necessary to determine a reference value for the guaranteed power and whether to set a larger value or a smaller value with respect to the reference value. Accordingly, to obtain the reference value, when the renegotiation request is received, the power reception apparatus may request the power transmission apparatus to notify the guaranteed power. Configuration may be taken such that the power transmission apparatus notifies the power reception apparatus of information indicating whether to raise or lower the requested value, in addition to notifying the guaranteed power. It is possible to obtain a similar effect to the present embodiment by such a configuration.

In addition, the power transmission apparatus may include, in the renegotiation request transmitted in step S603, an information element indicating whether to set a larger value or a smaller value with respect to the reference value. Specifically, configuration may be taken such that a bit indicating whether to increase the guaranteed power is stored in the renegotiation request, and the power reception apparatus determines to lower the guaranteed power if the bit is "0", and determines to raise the guaranteed power if the bit is "1".

In addition, when the power transmission apparatus makes the renegotiation request in step S603, configuration may be taken such that the power transmission apparatus notifies the power reception apparatus of Pm (the maximum value for the guaranteed power). Specifically, before the requested value is received from the power reception apparatus in step S506 or step S606, the power transmission apparatus notifies the power reception apparatus of Pm that is set in step S505 or step S605. By this it is possible to obtain a similar effect.

Second Embodiment

In the first embodiment, explanation was given regarding a configuration in which the guaranteed maximum output power Pm is changed based on the temperature of the power transmitting unit 103 of the power transmission apparatus 100 at the time t0. However, the electronic components that configure the power receiving unit 205, the power receiving coil 203, or the communication unit 204 of the power reception apparatus 200 have upper limits on temperatures at which operation is guaranteed. In the present embodiment, explanation is given for a configuration in which the requested value for the guaranteed maximum output power (represented as Pm' below) is changed, with reference to the temperature of the power reception apparatus 200 at the time t0 and FIG. 4. Note that it is assumed that the relationship between temperatures at which operation is guaranteed and the temperature detected by the power receiving unit 205 of the power reception apparatus 200 is similar to FIGS. 3A through 3B, and the relationship between output power of the power reception apparatus 200 and the temperature information of the power receiving unit 205 is similar to FIG. 4.

Figure 7:
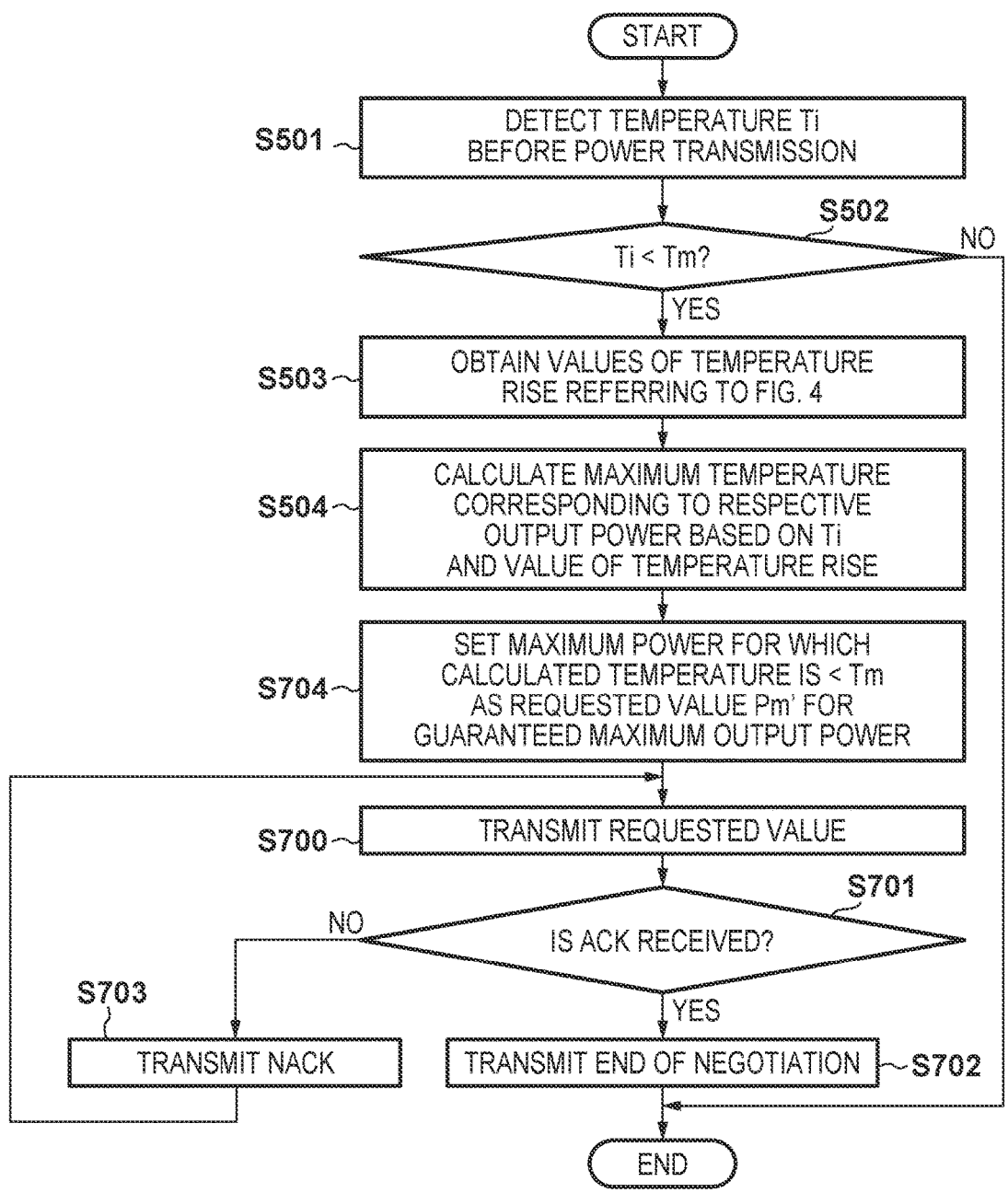
FIG. 7 illustrates a processing flow of a power reception apparatus in a second embodiment.

FIG. 7 is a processing flow of the power reception apparatus 200 in the present embodiment. The processing flow of FIG. 7 is substantially the same as the flow of FIG. 5. For the processing that is the same as the processing illustrated in FIG. 5, the same reference numeral is added, and explanation thereof is omitted. Note that a detection result by the temperature detection unit 201 of the power reception apparatus 200 is the curved line 311 of FIG. 3B.

The control unit 206 of the power reception apparatus 200, in step S704, sets the requested value Pm' for the guaranteed maximum output power. It is assumed that the maximum temperature Tm of the power receiving unit 205 is 60° C. and that the power receiving unit 205 before power reception is the temperature Ti (45° C.) (same as in the first embodiment). The maximum value of the temperature of the power receiving unit 205 with respect to the output power is, similarly to in the first embodiment, a value resulting from adding the value of a temperature rise of FIG. 4 to the temperature Ti of the power receiving unit 205 before power reception. Accordingly, the requested value Pm' for the guaranteed maximum output power, which is decided by the control unit 206 of the power reception apparatus 200 in step S704, is 5 watts which is the same as in the first embodiment. The control unit 206 of the power reception apparatus 200, in step S700, transmits to the power transmission apparatus 100 a request that includes the requested value Pm' for the guaranteed maximum output power. When the power transmission apparatus 100 receives an ACK (YES in step S701), the control unit 206 via the communication unit 204 transmits to the power transmission apparatus 100 a negotiation end message indicating the end of the negotiation regarding the guaranteed maximum output power (step S702). When the power transmission apparatus 100 does not receive an ACK (NO in step S701, a NACK is transmitted (step S703) and the process returns to step S700 to transmit to the power transmission apparatus 100 a request that includes the requested value Pm' for the guaranteed maximum output power.

By such operation, power transmission by the power transmission apparatus 100 is controlled so that an upper limit of the temperature in the power reception apparatus 200 is not exceeded, and the power reception apparatus 200 can continue to supply power to a load (a battery) continuously.

(Third Variation)

Figure 8:
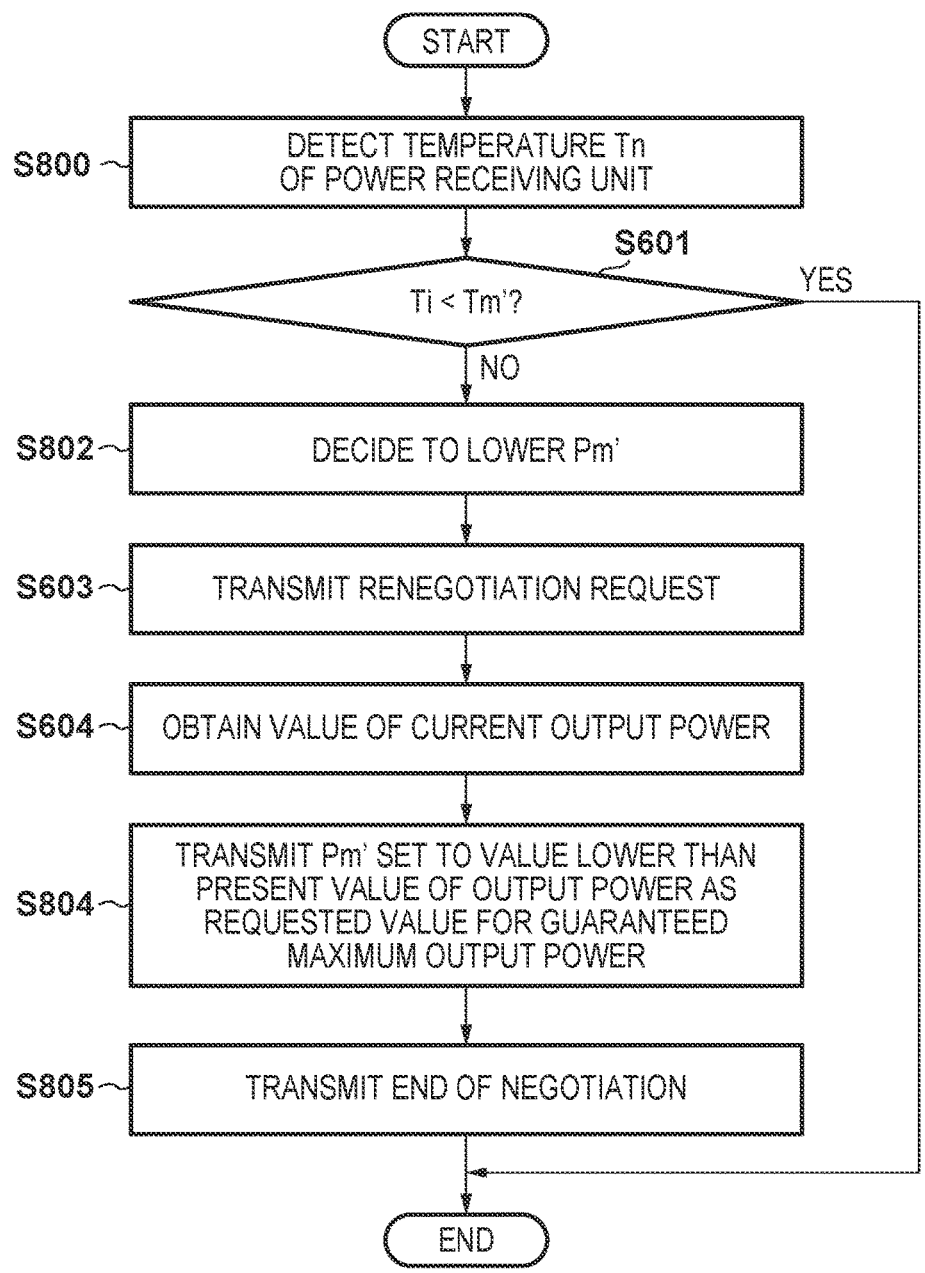
FIG. 8 illustrates a processing flow of the power reception apparatus in a third variation.

In the second embodiment, the control unit 206 of the power reception apparatus 200 decides the requested value Pm' for the guaranteed maximum output power based on the temperature Ti of the power receiving unit 205 before the time t0 when power reception starts. In the third variation, explanation is given with reference to FIG. 8 regarding an example in which the requested value Pm' of the guaranteed maximum output power is decided after the control unit 206 of the power reception apparatus 200 starts power reception. FIG. 8 is a processing flow of the power reception apparatus 200 in the present variation. The processing flow of FIG. 8 is substantially the same as the processing flow of FIG. 6A. For the processing that is the same as the processing illustrated in FIG. 6A, the same reference numeral is added, and explanation thereof is omitted. Note that, in the third variation, similarly to in the first variation, a detection result by the temperature detection unit 201 of the power reception apparatus 200 is the curved line 314 that is illustrated by a dashed-dotted line in FIG. 3B.

In step S800, the control unit 206 of the power reception apparatus 200 detects the temperature Tn of the power receiving unit 205 via the temperature detection unit 201. If the temperature Tn of the power receiving unit 205 exceeds the temperature Tm' (a temperature that is a few ° C. lower than the maximum temperature Tm), the control unit 206 decides to lower the requested value Pm' for the guaranteed maximum output power (step S802), and transmits a renegotiation request to the power transmission apparatus 100 via the communication unit 204. It is assumed that the requested value Pm' of the guaranteed maximum output power is 15 watts. The control unit 206 then obtains the current output power of the power receiving unit 205 by a detection circuit (not shown). Subsequently, in step S804, the control unit 206 changes the requested value Pm' of the guaranteed maximum output power to a value smaller than it is currently (for example 5 watts), and transmits a request that includes the requested value to the power transmission apparatus 100 via the communication unit 204 (step S804). Upon receiving an ACK from the power transmission apparatus 100 via the communication unit 204, the control unit 206 transmits a negotiation end message to the power transmission apparatus 100 (step S805). Because the requested value Pm' of the guaranteed maximum output power is 5 watts, the power receiving unit 205 can continue to supply power to a load because, similar to in the first variation, the temperature Tn of the power receiving unit 205 becomes smaller than the temperature Tm'.

In this way, by changing the requested value Pm' for the guaranteed maximum output power when the temperature Tn of the power receiving unit 205 has exceeded the temperature Tm' which is close to the maximum temperature Tm, it is possible to obtain a similar effect to that of the second embodiment. Similarly to in the second embodiment, it is clear by explanation thus far that, as the environmental temperature (the temperature of the power transmitting unit when power transmission starts) increases, the guaranteed maximum output power Pm decreases. Furthermore, it is also clear that the third variation is useful in an environment in which change of the environmental temperature is sharp, similarly to the first variation.

(Fourth Variation)

In the fourth variation, explanation is given regarding a different method for deciding Pm', but this corresponds to the method illustrated in the second variation. The detection result by the temperature detection unit 201 is a curved line illustrated by a dashed-two dotted line in FIG. 3B. In the third variation, when the temperature of the power receiving unit 205 that is detected by the temperature detection unit 201 reaches a steady value at a temperature lower than Tm, the control unit 206 of the power reception apparatus repeats negotiation with the power transmission apparatus 100 to gradually increase the requested value Pm' of the guaranteed maximum output power. For example, after the power receiving unit 205 initially starts power reception at the time t0 with the requested value Pm' of the guaranteed maximum output power as 3 watts, the temperature of the power receiving unit 205 reaches a steady state at the time t2. Here, if the temperature Tn of the power receiving unit 205 is less than the maximum temperature Tm, the control unit 206 may raise the requested value Pm' of the guaranteed maximum output power to 5 watts. Even with such a method, a similar effect to that of the second embodiment and the third variation is obtained.

In addition, by combining the third variation and the fourth variation, appropriate control is possible even in an environment where variation of the environmental temperature is sharp. For an environment where variation of the environmental temperature is sharp, a case where air conditioning (cooling) is turned on inside a vehicle with fully closed windows may be considered. Initially, in a high temperature environment inside the vehicle, a negotiation to lower the requested value Pm' for the guaranteed maximum output power is performed between the power transmission apparatus 100 and the power reception apparatus 200 in accordance with the processing flow of the third variation (FIG. 8) or the processing flow of the second embodiment (FIG. 7), and then the power transmission apparatus 100 starts power transmission. Next, the temperature inside the vehicle decreases due to the effect of the air conditioning, in response to it being detected that the temperature Tn of the power receiving unit 205 has entered a steady state or decreased due to the effect of the air conditioning, the control unit 206 of the power reception apparatus compares the temperature Tn of the power receiving unit 205 with the maximum temperature Tm. For example, if the maximum temperature Tm is greater than the temperature Tn of the power receiving unit 205 by 10° C. or more, the control unit 206 may perform processing to gradually raise the requested value Pm' for the guaranteed maximum output power in accordance with the fourth variation (similar processing to the processing at the time t2).

In addition the reference value for guaranteed power, which was explained in the first embodiment, may be obtained by the following configuration. Specifically, it is possible to obtain a similar effect if the power reception apparatus, when transmitting the renegotiation request, requests the power transmission apparatus to notify the guaranteed power in order to obtain the reference value.

Third Embodiment

In the present embodiment, the power transmission apparatus 100 decides the guaranteed maximum output power Pm based on the temperature of the power transmitting unit 103, and the power reception apparatus 200 decides the requested value Pm' for the guaranteed maximum output power based on the temperature of the power receiving unit 205. Explanation is given for a case in which, based on these values, the power transmission apparatus 100 and the power reception apparatus 200 perform a negotiation regarding final guaranteed maximum output power (hereinafter referred to as Pf).

Firstly, explanation is given regarding a case of deciding the final guaranteed maximum output power Pf at the time t0. If the guaranteed maximum output power Pm decided by the power transmission apparatus 100 is smaller than the requested value Pm' for guaranteed maximum output power that is decided by the power reception apparatus 200, the power transmission apparatus 100 transmits a NACK by NO in step S507 and the processing of step S511. The power reception apparatus 200 then changes the requested value Pm' for guaranteed maximum output power to a smaller value, and transmits the changed requested value to the power transmission apparatus 100. By repeating the processing of step S506 and step S507, the power transmission apparatus 100 transmits an ACK when the requested value Pm' for guaranteed maximum output power has become smaller than the guaranteed maximum output power Pm (step S508).

If the guaranteed maximum output power Pm decided by the power transmission apparatus 100 is larger than the requested value Pm' for guaranteed maximum output power that is decided by the power reception apparatus 200 (YES in step S507), the power transmission apparatus 100 transmits an ACK (step S508). In any case, the smaller of the guaranteed maximum output power Pm and the requested value Pm' for guaranteed maximum output power becomes the final guaranteed output power Pf. This is similar to the cases in which the power transmission apparatus 100 operated by the processing flow of FIG. 5 or FIGS. 6A through 6B, and in which the power reception apparatus 200 operated by the processing flow of FIG. 8.

Other Embodiments

A power transmission method of the wireless power transmission system in the present invention is not limited to a particular method. It may be a resonant magnetic coupling method in which power is transferred by coupling resonance of magnetic fields between a resonator (resonance element) of a power transmission apparatus and a resonator (resonance element) of a power reception apparatus. In addition, an electromagnetic induction method, an electric field resonance method, a microwave method, or a power transmission method that uses a laser or the like may be used.

In the explanation above, control communication by the communication unit 104 and the communication unit 204 was explained as so-called in-band communication that is performed superimposed on power that is transmitted from the power transmitting coil 105. However, there is no limitation to in-band communication, and it may be out-of-band communication, and may be a Bluetooth (registered trademark) Low Energy standard, Wi-Fi (registered trademark), Zigbee, or NFC.

The power transmission apparatus 100 and the power reception apparatus 200, for example, may be an image capturing apparatus (such as a camera or a video camera) or an image input apparatus such as a scanner, or may be an image output apparatus such as a printer, a copy device, or a projector. In addition, they may be a storage apparatus such as a hard disk apparatus or a memory apparatus, and may be an information processing apparatus such as a personal computer (PC) or a smart phone.

In addition, embedding the power transmission apparatus 100 and the power reception apparatus 200 in a printer, a PC, or the like is envisioned. In such a case, a situation may occur in which the temperature of the power transmitting unit (or the environmental temperature) Ti rises due to heat emitted due to operation of circuits other than the power transmission apparatus 100 that are not shown in FIG. 1, and guaranteed output power must be set to be small. In such a case, the following configuration may be taken in addition to the configurations of the first embodiment, the first variation, and the second variation.

For example, after successfully authenticating with the power reception apparatus 200 or when starting power transmission, the control unit 101 of the power transmission apparatus 100 makes a notification that power transmission is started to a control unit (not shown) that is not the power transmission apparatus 100 (a control unit that controls circuits other than the power transmission apparatus 100). The control unit that is not the power transmission apparatus 100 then restricts operation of one or a plurality of the circuits. By this, because power consumption by circuits other than the power transmission apparatus 100 decreases, it is possible to prevent a situation in which guaranteed output power must be reduced due to heat emitted because circuits other than the power transmission apparatus 100 are operating. Restricting operation of one or a plurality of the circuits may be reducing brightness of a display or turning it off. In addition, power consumption may be reduced by lowering a transmission rate of Wi-Fi (registered trademark) or turning it off. This may be processing for making one or a plurality of circuits other than the power transmission apparatus 100 enter a low power consumption state. The notification to the extent that power transmission is being started may be performed if the temperature of the power transmitting unit 103 has exceeded a predetermined value.

In addition, at least a portion of the flowcharts illustrated in FIG. 5 through FIG. 8 may be implemented by hardware. When implemented by hardware, an application-specific circuit on a FPGA may be generated automatically from a program for implementing each step, by using a predetermined compiler for example. FPGA is an abbreviation of Field Programmable Gate Array. In addition, a Gate Array circuit may be formed and implemented as hardware, similarly to with an FPGA.

In addition, the flowcharts illustrated by FIG. 5 or FIGS. 6A through 6B may be started when a power supply is inputted to a power transmission apparatus. In addition, the flowcharts illustrated by FIG. 7 or FIG. 8 may be started when a power supply is inputted to the control unit of a power reception apparatus. Note that the flowcharts illustrated by FIG. 7 and FIG. 8 are realized by the power receiving unit executing a program stored in a memory (not shown) inside the power reception apparatus 200. In addition, configuration may be taken in which some or all of the steps illustrated in the flowcharts illustrated in FIG. 5 through FIG. 8 are realized by hardware such as an ASIC for example.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-179024, filed Sep. 13, 2016 which is hereby incorporated by reference herein in its entirety.

What is claimed is:

1. A power transmission apparatus that performs power transmission wirelessly to a power reception apparatus, the power transmission apparatus comprising:

a temperature detector that detects a temperature inside or in a periphery of the power transmission apparatus;
one or more memories that store a set of instructions; and
one or more processors that execute the instructions to;
set a value for power that can be transmitted to the power reception apparatus under a condition where the temperature detected by the temperature detector does not exceed a predetermined temperature when performing power transmission to the power reception apparatus,
control to perform power transmission wirelessly to the power reception apparatus based on the set value for power.

2. The power transmission apparatus according to claim 1, wherein the one or more processors execute the instructions to; control to restrict power transmission if the temperature detected by the temperature detector exceeds the predetermined temperature.

3. The power transmission apparatus according to claim 1, wherein the one or more processors execute the instructions to;
set, based on the temperature detected by the temperature detector, a maximum output power value for the power reception apparatus to use to perform charging, by using power transmitted from the power transmission apparatus, under a condition that the temperature detected by the temperature detector does not exceed the predetermined temperature due to power transmission, and
control to perform power transmission to the power reception apparatus with power necessary for the power reception apparatus to output power that is less than or equal to the maximum output power value.

4. The power transmission apparatus according to claim 3, wherein the one or more processors execute the instructions to,
if a value for power requested by the power reception apparatus is less than or equal to the set maximum output power value, control to transmit a notification indicating performance of power transmission, and control to perform power transmission to the power reception apparatus with power necessary for the power reception apparatus to output the requested power.

5. The power transmission apparatus according to claim 4, wherein the one or more processors execute the instructions to,
if a value for power requested by the power reception apparatus that is included in a request received exceeds the set maximum output power value, control to transmit a notification indicating non-performance of power transmission, and control not to perform power transmission.

6. The power transmission apparatus according to claim 1, wherein the value for power is set based on the detected temperature before performing power transmission.

7. The power transmission apparatus according to claim 1, wherein the value for power is set to be smaller the higher that the detected temperature is.

8. The power transmission apparatus according to claim 1, wherein the one or more processors execute the instructions to,
if the temperature detected by the temperature detector has reached a steady state at a temperature lower than the predetermined temperature while power transmission is being performed, control to change the value of power that can be transmitted to the power reception apparatus to a larger value.

9. The power transmission apparatus according to claim 1, wherein the one or more processors execute the instructions to; control to reduce power supplied to the power reception apparatus if the temperature detected by the temperature detector exceeds a predetermined value lower than the predetermined temperature while power transmission is being performed.

10. The power transmission apparatus according to claim 9, wherein the one or more processors execute the instructions to;
obtain an output power value for the power reception apparatus to perform charging,
control to reduce power supplied to the power reception apparatus so that a value lower than the obtained output power value becomes the output power for the power reception apparatus to perform charging if the temperature detected by the temperature detector exceeds the predetermined value while power transmission is being performed.

11. The power transmission apparatus according to claim 1, wherein the temperature detector detects a temperature of a part inside the power transmission apparatus or a temperature of air surrounding the power transmission apparatus.

12. The power transmission apparatus according to claim 1, wherein the value for power that can be transmitted to the power reception apparatus is set based on a detected temperature when starting power transmission or a detected temperature while power transmission is being performed.

13. A power reception apparatus that receives power wirelessly from a power transmission apparatus, the power reception apparatus comprising:
a temperature detector that detects a temperature inside or in a periphery of the power reception apparatus;
one or more memories that store a set of instructions; and
one or more processors that execute the instructions to;
set a requested value for output power for performing charging by using power transmitted from the power transmission apparatus, under a condition that the temperature detected by the temperature detector does not exceed a predetermined temperature when power reception is being performed;
control to transmit the requested value to the power transmission apparatus; and
control to receive power wirelessly,
based on reception of a notification indicating that power is to be transmitted from the power transmission apparatus after transmitting the requested value, so that power corresponding to the requested value can be outputted.

14. The power reception apparatus according to claim 13, wherein the one or more processors execute the instructions to;
change the requested value for output power for performing charging by using power transmitted from the power transmission apparatus to a value lower than a value for current output power if the temperature detected by the temperature detector exceeds a predetermined value that is lower than the predetermined temperature, and
control to transmit the changed requested value is transmitted to the power transmission apparatus.

15. The power reception apparatus according to claim 13, wherein the requested value for power is increased if the temperature detected by the temperature detector reaches a steady state at a temperature lower than the predetermined temperature.

16. The power reception apparatus according to claim 13, wherein the temperature detector detects a temperature of a part inside the power reception apparatus or a temperature of air surrounding the power reception apparatus.

17. A method of controlling a power transmission apparatus that performs power transmission wirelessly to a power reception apparatus, the method comprising:
detecting a temperature inside or in a periphery of the power transmission apparatus; setting a value for power that can be transmitted to the power reception apparatus under a condition where the temperature does not exceed a predetermined temperature when power transmission to the power reception apparatus is performed; and
performing power transmission to the power reception apparatus based on the set value for power.

18. A method of controlling a power reception apparatus that receives power wirelessly from a power transmission apparatus, the method comprising:
detecting a temperature inside or in a periphery of the power reception apparatus;
setting a requested value for output power for performing charging by using power transmitted from the power transmission apparatus, under a condition that the temperature does not exceed a predetermined temperature when power reception is being performed; and
receiving power wirelessly,
based on reception of a notification indicating that power is to be transmitted from the power transmission apparatus after transmitting the requested value so that power corresponding to the requested value can be outputted.

19. A non-transitory computer-readable storage medium storing a program which causes a computer to execute a method of controlling a power transmission apparatus that performs power transmission wirelessly to a power reception apparatus, the method comprising:
detecting a temperature inside or in a periphery of the power transmission apparatus;
setting a value for power that can be transmitted to the power reception apparatus under a condition where the temperature does not exceed a predetermined temperature when power transmission to the power reception apparatus is performed; and
performing power transmission to the power reception apparatus based on the set value for power.

20. A non-transitory computer-readable storage medium storing a program which causes a computer to execute a method of controlling a power reception apparatus that receives power wirelessly from a power transmission apparatus, the method comprising:
detecting a temperature inside or in a periphery of the power reception apparatus;
setting a requested value for output power for performing charging by using power transmitted from the power transmission apparatus, under a condition that the temperature detected does not exceed a predetermined temperature when power reception is being performed; and
receiving power wirelessly,
based on a reception of a notification indicating that power is to be transmitted from the power transmission apparatus after transmitting the requested value so that power corresponding to the requested value can be outputted.

* * * * *